EIBERWEISER & WEBER.
Straw Cutter.
No. 58,080. Patented Sept. 18, 1866.
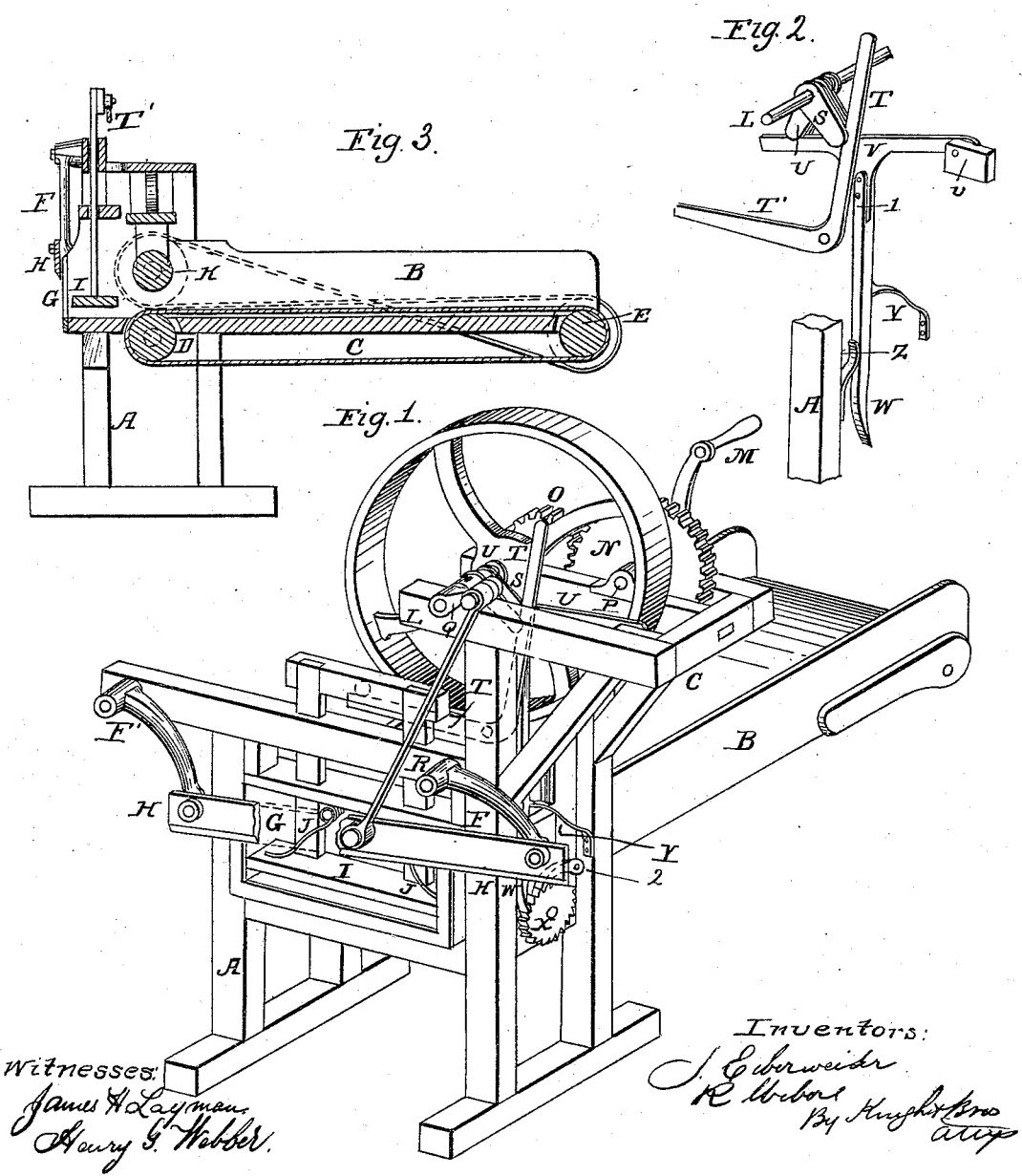

UNITED STATES PATENT OFFICE.

J. EIBERWEISER AND R. WEBER, OF CINCINNATI, OHIO.

IMPROVEMENT IN STRAW-CUTTERS.

Specification forming part of Letters Patent No. 58,080, dated September 18, 1866.

*To all whom it may concern:*

Be it known that we, JOHN EIBERWEISER and RUDOLF WEBER, both of Cincinnati, Hamilton county, Ohio, have invented a new and useful Fodder-Cutter; and we do hereby declare the following to be a full, clear, and exact description thereof, reference being had to the accompanying drawings, making part of this specification.

Our invention relates to an automatic machine for cutting or chopping hay, straw, or other fodder to any desired length.

Figure 1 is a perspective view of a machine embodying our invention. Fig. 2 shows parts of the pressure and feeding mechanism detached. Fig. 3 is a longitudinal section through the feeding-trough and throat.

A is a suitable frame supporting a horizontal feed-trough, B, covered with an apron, C, which is stretched around two rollers, D E, of which one, D, is the driver. Suspended by arms F F' in front of the throat G is a knife, H.

I is a pressure-board, which, except when temporarily lifted, as hereinafter explained, is pressed downward upon the fodder by means of springs J J'. K is a feed and pressure roller, operated by a cross-belt from the roller E.

P is the driving-shaft, journaled horizontally in the top of the frame, and having a winch, M, and a spur-wheel, N, which gears with a pinion, O, upon the counter-shaft L, which shaft terminates in a crank, Q, pitmaned, R, to the knife.

A cam, S, upon the counter-shaft acts on the long arm of a bent lever, T T', whose short arm is thus caused, at the proper moment, to lift the pressure-board I. Another cam, U, on the same shaft acts on an arm, V, hinged at $v$ to the frame and having pivoted to it a feed-hand, W, which engages in the teeth of a ratchet-wheel, X, upon the shaft of the roller D.

Y is a spring which retracts the feed-hand when relieved from the action of the cam. Z is a spring which acts to maintain the feed-hand in gear with the ratchet.

1 is a series of perforations for enabling the adjustment up or down of the feed-hand, so as to give a longer or shorter feed between each pair of strokes of the knife.

2 is a pawl for preventing a retrograde motion of the ratchet.

We claim herein as new and of our invention—

The arrangement of a knife, H, suspended by two arms, F F', pressure-board I, bent lever T T', feeding mechanism C D E V W X, and cams S and U, for the purposes explained.

In testimony of which invention we hereunto set our hands.

JOHN EIBERWEISER.
RUDOLF WEBER.

Witnesses:
GEO. H. KNIGHT,
JAMES H. LAYMAN.